Dec. 29, 1936. J. N. VANDEGRIFT ET AL 2,066,083
FUEL AND METHOD OF PRODUCING SAID FUEL
Filed May 10, 1933 4 Sheets-Sheet 1

Fig.1

INVENTOR
James N. Vandegrift
Carl Portel
BY
Kenyon & Kenyon
ATTORNEYS

Dec. 29, 1936.  J. N. VANDEGRIFT ET AL  2,066,083

FUEL AND METHOD OF PRODUCING SAID FUEL

Filed May 10, 1933  4 Sheets-Sheet 2

Fig. 2.

INVENTOR
James N. Vandegrift
Carl Postel
BY
Kenyon & Kenyon
ATTORNEYS.

Dec. 29, 1936.   J. N. VANDEGRIFT ET AL   2,066,083
FUEL AND METHOD OF PRODUCING SAID FUEL
Filed May 10, 1933   4 Sheets-Sheet 3

Fig. 3.

INVENTOR
James N. Vandegrift
BY Carl Postel
Kenyon Kenyon
ATTORNEYS

Patented Dec. 29, 1936

2,066,083

UNITED STATES PATENT OFFICE 2,066,083

FUEL AND METHOD OF PRODUCING SAID FUEL

James N. Vandegrift and Carl Postel, New York, N. Y., assignors to Coal Products Co. of Delaware, New York, N. Y., a corporation of Delaware Application May 10, 1933, Serial No. 670,224

8 Claims. (Cl. 202—35)

This invention relates to a new type of domestic fuel and to a method of producing the new fuel. It relates more particularly to producing a new substantially smokeless domestic fuel in lump form and of high heating value at low cost from cokable material such as slack or waste from screened bituminous coking coals and mixtures of bituminous coking coals with non-coking coals such as finely divided anthracite, lignite or sub-bituminous coals. This application is a continuation in part of our application, Serial No. 457,466, filed May 29, 1930.

Heretofore coke has been produced by the so-called high temperature distillation process wherein the coking range is from approximately 1800° to 2000° F. to recover as large a quantity of gas as possible for public utility purposes with a porous coke of low volatile content; i. e. about 1% or less, affording an inferior domestic fuel or else to recover primarily a metallurgical coke also of less than 1% volatile content, with gas and tar as by-products, the coke likewise being porous and affording an inferior domestic fuel when used for that purpose owing to difficulty of starting and maintaining a fire in domestic furnaces, stoves and heaters.

Coke has also been produced heretofore by so-called low temperature distillation processes employing temperatures of 1000° to 1100° F. to recover a maximum quantity of oils and tar and to obtain a relatively small volume of gas and a semi-coke which is light in weight and of very friable structure and which ordinarily requires briquetting before the same can be advantageously used for domestic fuel.

According to the present invention, the new fuel which forms a part thereof is produced as a result of what may be called intermediate temperature distillation wherein the most efficient temperature has been found to be between about 1200° F. and about 1600° F. It is a feature of this invention that a body of cokable material is carbonized at approximately the temperatures above mentioned while the non-volatilized constituents of the material are compacted to a substantially greater extent than that resulting from the weight of the non-volatilized constituents in the coking mass. By thus carbonizing successive bodies or batches of solid cokable material, the temperatures employed serve to rapidly distill off the gases and vapors and the non-volatilized constituents are rendered sufficiently plastic so that the compacting force exerted upon them tends to compress the non-volatilized constituents to a dense mass which when carbonized produces a hard dense coke containing only very small pores as will be described more in detail below. The correlation of plasticity produced at the temperatures referred to and the compacting force exerted upon the non-volatilized constituents while in a plastic condition contribute to producing the improved results above referred to. It is desirable to compact the non-volatilized constituents of a coking mass so that the finished coke contains relatively few pores greater than .04 inch in diameter and preferably so that the coke contains relatively few pores larger than .01 inch in diameter.

A further feature of this invention resides in employing solid cokable material which tends to expand upon coking and confining the non-volatilized constituents of the material against substantial expansion while the material is being coked at a temperature which tends to expand it. Thus the expansive force of the material itself causes the coking material while passing through the plastic stage of carbonization to set into a hard dense structure. For example, when a body of cokable material such as slack from screened bituminous coking coal is heated peripherally inwardly at the preferred temperatures above mentioned, the body of coking coal will tend to expand with considerable force, due, it is believed to the swelling of the non-volatilized constituents and to the generation of gases and vapors within the body of material. If the body of material were left substantially unconfined it would swell up and result in a coarsely porous and easily friable mass but, if in the practice of this invention, the non-volatilized constituents are confined against substantial expansion while being carried through the plastic stage, the plastic mass sets into a very compact and dense coke. The making of a tumescent plastic mass and the confining of the non-volatilized constituents thereof against substantial expansion results in a particularly hard dense coke.

In the practice of this invention it is preferable to preheat the solid cokable material sufficiently to substantially dehydrate the same. This is preferably done without substantially burning or coking the mass. The reason for dehydrating the coking material is that improved results are afforded by reducing the amount of steam that is generated by vaporization of water in the mass during the carbonization of the material as the presence of excessive amounts of steam during the carbonization of the mass materially increases the time for carbonization and tends to prevent a firm set of the plastic material into a hard and finely porous coke.

It is also preferable in the practice of this invention to introduce the dehydrated and preheated material into a zone wherein the temperatures resulting in carbonization are afforded prior to substantial cooling of the preheated and dehydrated material. For example, it is preferable to introduce the preheated coke into the distillation zone at a temperature of about 350° F. Thus, a measured quantity of material can be heated to dehydrate the same in a preheating tube and charged directly into a preheated retort tube which has perferably already been heated to the preferred carbonizing heat i. e. about 1200° F. to about 1600° F. Thus, the distillation of gases and vapors is caused to commence immediately and rapidly with a resultant forceful expanding of the body of material being carbonized. The suddenness or instantaneousness with which the body of cokable material is subjected to distillation heat is one of the features of this invention. Then, by continuing to rapidly distill the material while compacting the non-volatilized constituents preferably by preventing any substantial expansion thereof, the mass of plastic non-volatile constituents is made to result in a very hard dense and compact coke. While the body of material is thus being carbonized with rapid distillation of gases and vapors, it is also preferable to restrict the escape of the gases and vapors from the retort in which the material is being carbonized to an outlet at the top of said retort, thus further compressing and compacting the non-volatilized material confined in the retort into a dense structure.

A further feature of this invention resides in disposing a body of solid cokable material in the form of an elongated body or column during the carbonization operation. The column of material is preferably disposed in a vertical position although it may be disposed in other positions without departing from this invention. By disposing the material in the form of a column a relatively large peripheral surface is exposed and by heating the column peripherally inwardly a very rapid evolution of gases and vapors is afforded. Moreover, by permitting the escape of the gases and vapors that are rapidly distilled off substantially entirely only at one end of the column, the gases and vapors in being forced to the remote avenue of escape build up pressure on the non-volatilized constituents of the coking mass which has the effect of compacting non-volatilized constituents into hard dense coke. It has been found that the gases and vapors are driven peripherally inwardly toward the center of the column and tend to create a hollow core usually along the approximate longitudinal axis of the column. The gases and vapors instead of traversing the column to the avenue of escape in a multiplicity of minute passages which would tend to make the resulting coke porous, have the tendency to escape by the single hollow core with the remarkable result that the non-volatilized constituents of the column of material are pushed radially toward the periphery of the column and are firmly compacted in a very finely porous compact and dense condition which results in a hard dense coked product. Moreover, the passage of the evolved gases and vapors only through the short radial distance to the central core in the coking mass does not disrupt the material and permits the formation of a hard dense coke.

It is another feature of this invention that a column of the solid cokable material is carbonized by heating the same peripherally inwardly and stopping the carbonization treatment when the coked material adjacent the periphery of the column has a relatively low volatile content but the coked material adjacent the center of the column, e. g. about the hollow core above described, has a relatively higher volatile content exclusive of moisture. Thus, the column when broken up affords a plurality of lumps substantially each of which will contain a slow burning portion of low volatile content and a quick igniting portion of relatively higher volatile content, thus affording a fuel which is slow burning and quick igniting at the same time.

A still further feature resides in carbonizing solid cokable material according to this invention in the form of a column until the coking column of material cracks or develops lines of fracture, both laterally and longitudinally in the mass. To illustrate this feature of this invention, it has been found that when solid dehydrated cokable material is carbonized in a column about 5 or 6 inches in diameter for about one to two hours by applying heat thereto peripherally inwardly by subjecting the periphery to temperatures of about 1200° F. to about 1600° F. while confining the non-volatilized constituents of the material against substantial expansion, the gases and vapors being withdrawn from an end of the column through a hollow core formed in the column by the gases and vapors, at the conclusion of the coking operation, the non-volatile constituents while remaining dense and compact, become separated into lumps by the formation of laterally and longitudinally extending cracks extending radially from the hollow core. The coking mass thereby becomes fractured into lumps which are to the extent of about 90% of so-called "stove" and "chestnut" sizes and range from about 1 to 4 inches in thickness. This remarkable result affords a product which as withdrawn from the coking retort, is already fractured into lumps of desirable size for domestic fuel. Furthermore, it is also remarkable that the lumps are for the most part wedge-shaped in form and nearly all of the lumps of the fuel have a quick igniting tip of relatively high volatile content and a long burning body portion of lower volatile content. Inasmuch as the size and form of the lump results partly from the diameter of the column of material that is being coked, it is one of the features of this invention that the cokable material is coked under the conditions of this invention in a column approximately 5 or 6 inches in diameter.

In the practice of the invention, advantageous results can be obtained from the use of slack bituminous coal or the waste from screened bituminous coking coal, although run of mine coal including lumps as well as fines may be used. A coking coal containing about 18%, for example, of volatile matter exclusive of moisture and not over 2% moisture and 4% ash is advantageous for this process in yielding a maximum quantity of domestic fuel. As a result of the process forming part of this invention, the resultant fuel for domestic purposes made from a coking coal of the character above described will be approximately 88% of the weight of the coal treated with approximately 3% in coke fines, 3% in tar and about 8% gas per ton of weight. As distinguished from high temperature distillation where gas or metallurgical coke are the objectives and low temperature distillation where oil and tars are the principal products; the fuel or semi-coke obtained is the primary object in view in the present invention. The gas obtained as a result may very well be used to supply the heat necessary for the operation of the process.

The fuel obtained as a result of this process is preferably of a size corresponding to the so-called "stove" and "chestnut" sizes of anthracite supplied for domestic purposes. This fuel ordinarily contains approximately 6% to 8% volatile matter exclusive of moisture as compared with 4% for average anthracite coal; although it may be made to contain about 4% to about 10% volatile matter on the average. The new fuel contains approximately 14,300 B. t. u. heat value per pound as compared with about 12,000 to 13,500 B. t. u. for anthracite and has an ash content of approximately 5% as compared with 17% for anthracite. Moreover, the ash from the new fuel has been found in practice to fall through the grate in powdery form without clinkers while the average anthracite coal contains 12 to 14% of unburnt carbon. It will thus be seen that the new fuel with the consumption of all the carbon averages 20% to 30% higher in heat value than anthracite and as a result of the new process this fuel can be manufactured from cheap bituminous coals, available in enormous and widely distributed deposits, at a much cheaper cost than anthracite can be mined.

Further features of the new fuel relate to the very close grained and minutely porous nature of the coke. Preferably, relatively few pores in the lump of the new coke are larger than about .01 inch in diameter, although some of the advantages of this invention are afforded though in lesser degree when only relatively few pores are larger than about .04 inch in diameter. To further illustrate, in the new fuel, pores larger than .04 inch in diameter normally constitute less than 10% of the total number of pores and with good operation of the invention such larger pores will constitute less than about 5% of the total number of pores. Moreover, the major portion of the pores is usually of less diameter than .04 inch. Thus, it is seen that the new coke has a very compact structure as compared with high temperature distillation by-product coke, for example, which normally has a porous structure wherein a very large number of pores are about .07 inch in diameter. Thus, in the new fuel of this invention, the pores in the coke run definitely less in size than the pores of high temperature by-product coke which is in the market at the present time and preferably the pores are 7 or 8 times smaller in the new coke. The close grained minutely porous structure of the new fuel of this invention is believed to account for its exceptionally long burning properties. The new fuel in burning appears to burn only at the surface, the small amount of ash contained therein falling off as a dust. On the other hand, anthracite coal, due to the fact that it crumbles readily under combustion, and high temperature distillation by-product coke, due to the fact that it is coarsely porous, permit more rapid entry of the zone of combustion to the center of the lumps thereof with resultant more rapid consumption of the individual lumps. With the new fuel of this invention, there is no fusing of ash or formation of clinkers and none of the fixed carbon is lost or unburned because contained in ashes or clinkers.

It is a further feature of the new coke of this invention that it is not only finely porous but is hard substantially throughout. For purposes of illustration, tests show that an average lump of the new fuel will withstand a crushing strain of in the neighborhood of 900 pounds per square inch. A lump coke of such resistance to crushing strains is to be regarded merely as a preferred embodiment of this invention. This compares with 200 to 300 pounds per square inch for ordinary powdered coal briquettes using pitch or starch binders and with about 50 to 75 pounds per square inch for low temperature distillation coke which is at present on the market. The new fuel is harder substantially throughout than anthracite coal. This comparison is made with Pennsylvania anthracite coal of laminated or cubical structure which has been found to exhibit failure at least in one direction at pressures from about 300 to 400 pounds per square inch. The new fuel is approximately as hard as high temperature distillation by-product coke which is at present on the market and which contains 1% or less of volatile matter exclusive of moisture. As far as the different portions of individual lumps are concerned tests show that the portion of the individual lumps (about ¼ inch in thickness) which has the highest volatile content shows a resistance to crushing strain which is about 70% of the portion of the lumps (about ¼ inch in thickness) which has the lowest volatile content and which is normally the hardest. The lumps of new fuel as a whole and including the portions of highest volatile content will sustain a crushing strain comparable to bee-hive or by-product metallurgical coke of less than 1% volatile content exclusive of moisture. The very hard character of the individual lumps makes the new coke of this invention useful not only for domestic fuel but also for metallurgical purposes. Heretofore, the only coke which was strong enough to support the weight of a charge in an iron furnace has been high temperature distillation by-product or bee-hive coke which only contains about 1% or less of volatile matter exclusive of moisture. The use for metallurgical purposes of a coke having a volatile content exclusive of moisture that is substantially higher than that of the by-product coke has certain decided advantages, for example, in the production of pig iron. The new fuel of this invention affords for the first time a coke which has a relatively high volatile content and which, at the same time, is sufficiently hard and strong for metallurgical purposes.

A further feature of the new coke of this invention resides in the fact that the individual lumps are characterized by having a body portion of relatively low volatile content exclusive of moisture and a quick igniting portion of relatively higher volatile content exclusive of moisture than the body portion. Thus, the lumps of fuel comprise a hard dense portion which may have, for example, about 6% to about 10% volatile matter and another hard dense portion having about 2% to about 5% of volatile matter, the volatile matter being graduated in the lump between the two portions. Preferably, the amount of volatile matter in the two portions differs by more than about 3%. Thus, by way of illustration, analysis of a specific sample of the new lump coke about 1 to 4 inches in diameter and having a volatile content of about 5.6% on the average showed that the individual lumps had an external portion extending about ¼ inch into the lump having a volatile content exclusive of moisture of about 8% and that on the opposite side of the lumps a portion extending about ¼ inch into the lump had a volatile content exclusive of moisture of about 3%.

Thus as to volatile content exclusive of moisture, the individual lumps of the new fuel of this invention have a portion which approaches the 10% to 12% volatile content of low temperature distillation coke and a second portion which approaches the 1% or less volatile content of high temperature by-product coke. This combination in individual lumps especially those about 1 to 4 inches in diameter, is one of the features of this invention. Moreover, in no part do the individual lumps have the fragile and coarsely porous structure of low temperature coke or the coarsely porous structure of by-product metallurgical coke.

It is a further feature of this invention that the individual lumps are for the most part wedge-shaped with the higher volatile portion at the tip of the wedge as a result of being coked by being heated peripherally inwardly in a column mass. Thus the slower burning body portion of lower volatile content is normally larger than the external quick igniting portion of higher volatile content at the tip of the wedge.

Due to the hardness and minute porosity and due to the average volatile content exclusive of moisture and the distribution of volatile content, the new fuel of this invention has remarkably improved properties. Thus, as compared with like amounts of anthracite coal and high temperature by-product coke, the new fuel has been found to ignite about 4 or 5 times as quickly as either the anthracite coal or the by-product coke and to heat an oven at a given temperature approximately twice as long. The new fuel in use for domestic heating purposes has been found to be about 30% to 60% more efficient in use than anthracite coal. Not only does the new fuel possess remarkable properties, but also it can be made from cheap materials at low cost according to the process of this invention.

An object of this invention is to provide a new and useful process for obtaining a new domestic fuel from low volatile bituminous slack or waste, although it should be understood that by treating higher volatile bituminous coals a relatively larger recovery of gas and tar with less solid fuel may be obtained. By employing cokable material containing about 15% to about 18% of volatile matter exclusive of moisture a satisfactory amount of gas is obtained for combustion in supplying heat to the retort tubes. Cokable materials containing lesser amounts of volatile matter will not produce as large a quantity of gas but can be successfully coked according to this process. On the other hand, cokable material containing greater amounts of volatile matter can also be coked according to this invention but in such case there will be an excess of gas beyond that which is necessary to supply heat for the coking operation. It is usually preferable to employ cokable material containing about 14% to about 25% of volatile matter exclusive of moisture in the practice of this invention. Moreover, a cokable material containing a relatively high amount of volatile matter may be mixed with a material of relatively low volatile content to produce a mixture having any desired volatile content. For example, a cokable material containing from about 25% to about 36% volatile matter may be mixed with non-coking coal such as anthracite coal (containing about 4% to about 6% volatile matter) or with a sub-bituminous coal to afford a cokable mixture containing cokable bituminous coal, which mixture has a volatile content between about 15% and about 18%. Furthermore, a cokable material of relatively high volatile content may be mixed with a material such as carbonized lignite, carbonized brown coal or ordinary coked fines to produce a cokable mixture which may be coked into hard dense lumps according to this invention.

Another object of this invention is to provide means for practicing the above-mentioned process in very large scale production with a minimum labor cost.

For the purpose of giving an illustration of this invention, one method of practicing the process of the invention and of producing the new fuel of the invention, will be given as follows: The slack or waste from screened bituminous coal, preferably of a low volatile content (e. g. 16% to 20%) is first preheated to drive off all the moisture or nearly all of the moisture, after which it is instantaneously subjected, in a columnar form about 5 or 6 inches in diameter to a peripheral temperature of about 1200° F. to about 1600° F. This can be conveniently done by suddenly charging the preheated and dehydrated material into a vertical retort tube tapered so as to be an inch or two larger at the bottom than at the top and averaging about 8 or 10 feet in length, and averaging about 5 or 6 inches in diameter and heated so as to be about 200° hotter at the bottom than at the top within the above temperature range. The difference in temperature between top and bottom is designed to compensate for the difference in diameter of the column of coal within the tube at the top and bottom so that there will be a substantially similar degree of coking at the top and bottom. The temperatures named are the temperatures of the retort tube rather than the furnace temperature which must be maintained from 100° F. to 150° F. higher than the temperatures mentioned. As distinguished from the present processes of low and high temperature distillation wherein the heat is usually applied gradually, the present invention utilizes a method of instantaneously subjecting the coal to the temperatures above mentioned, thus starting the immediate expulsion of vapors from the preheated coal. In order that the preheated coal will not form a solid mass as a result of this intermediate temperature, use is made of vertical retorts with a short cylindrical section at the top from which it tapers to a slightly enlarged diameter at the lower end. To illustrate, it has been found that when the preheated coal is dumped into a battery of such round tubular retorts, previously heated to afford instantaneous application of heat to the coking coal brought into contact therewith and when the non-volatilized constituents thereof are confined therein under pressure to prevent swelling while in a plastic condition, the immediate expulsion of gas and vapor from the material in radial lines to the center causes the forming and maintaining of a central core in the mass of a size sufficient to permit the vapors to escape during the entire process of carbonization. By confining the columns of material against substantial expansion, the non-volatilized constituents thereof from top to bottom become substantially uniformly compacted to produce a hard dense coked product. Likewise, we have in operation by applying heat and pressure as above described caused the mass to break along irregular radial lines from the core to the walls of the retort and also to break irregularly along substantially uniformly spaced horizontal planes, producing a hard dense smokeless fuel of which 70% is stove and 20% chestnut sizes approximately in ordinary practice.

The preheated coal is subjected to this intermediate temperature for approximately an hour and a half as compared with twelve to twenty-four hours in the present processes. During this time the heat applied to the walls of the battery of vertical tubes so as to subject the periphery of the columns of material within the tubes to temperatures of about 1200° F. to about 1600° F. causes the expulsion of nearly all the volatile matter from that portion of the coal resting against the walls, but a sufficient amount of volatile matter remains in the central part of the mass to cause the material to have an average volatile content of about 7% with a maximum of 10% in the portion of each lump adjacent the central core and a minimum of about 2% in the portion adjacent the wall of the retort. After the material has been treated for approximately an hour and a half, it may be dumped and cooled while sealed from air. It is then ready for domestic purposes.

In practicing the process hereinbefore set forth, apparatus of various types may be employed as will be readily apparent, and one form of apparatus which has been found to operate efficiently is herein illustrated and described. The apparatus consists briefly of a novel type of charging car holding a measured quantity of coal which it delivers to a battery of preheating vertical tubes in which the bituminous coking coal is subjected to a relatively low temperature for the purpose of driving off the moisture content; burners to maintain the desired temperatures the height of the retort tubes; a battery of intermediate temperature distillation retort tubes into which the preheated coal may be introduced; means for preventing the coke mass from expanding while in a plastic condition in the retort tubes; a chamber for cooling the coke while sealed from air; and a member for collecting the vapors and gases evolved in the distillation process. These vapors may be conveyed to a condenser or other suitable recovering apparatus while the gases may be utilized for supplying heat to the retort or for other purposes.

Other objects and features of the invention will become apparent by reference to the accompanying drawings illustrating apparatus for carrying out the process and the description pertaining thereto, in which.

Referring now to the drawings, 10 indicates vertical beams supporting a horizontal beam 11 which in turn supports a vertical beam 12 to which is fastened a horizontal track 13 which is supported at its other end by agencies not illustrated. Extending upwardly from track 13 are beams 14 between the tops of which is a bar 15. It is to be understood that this construction is duplicated at the other end of the mechanism and that a similar bar 15 is likewise provided. Extending between the bars 15 are a pair of rails 16 along which wheels 17 of a coal charging car 18 may roll. This car 18 as shown has a slanting bottom composed partly of drop doors 19 which are movable to the position shown in dotted lines in Fig. 1 and which in combination with the fixed ends of the car which extend downward to clear the plate 25 form a chute to uniformly fill all the preheating tubes 23.

Movable along the rails 13 are spaced wheels 20, the journals of which rotate in hangars 21 secured to cross-beams 22. The respective cross-beams 22 at each end of the mechanism serve as supports for a battery of preheating tubes 23 encased in a refractory material 24. The plurality of tubes 23 may be secured within the casing in any desired manner so long as they are restrained from vertical movement. Across the top of the casing provided by the walls 24 is a plate 25 having openings corresponding to the tops of the respective tubes 23, thereby producing a plane flat surface broken only by the respective openings into the various tubes. The bottoms of the tubes 23 are each formed with reduced diameter as indicated at 26, and a plate 27 having alternate openings is provided for closing the bottoms of the tubes. This plate is slidable so that the openings may register with the bottoms of the tubes when the material in the tubes is to be dumped.

The end plate with which the dumping car 18 is provided extends down almost into contact with the top plate 25 for the purpose of removing any excess coal resting on this plate.

Figures 4, 5, 6:
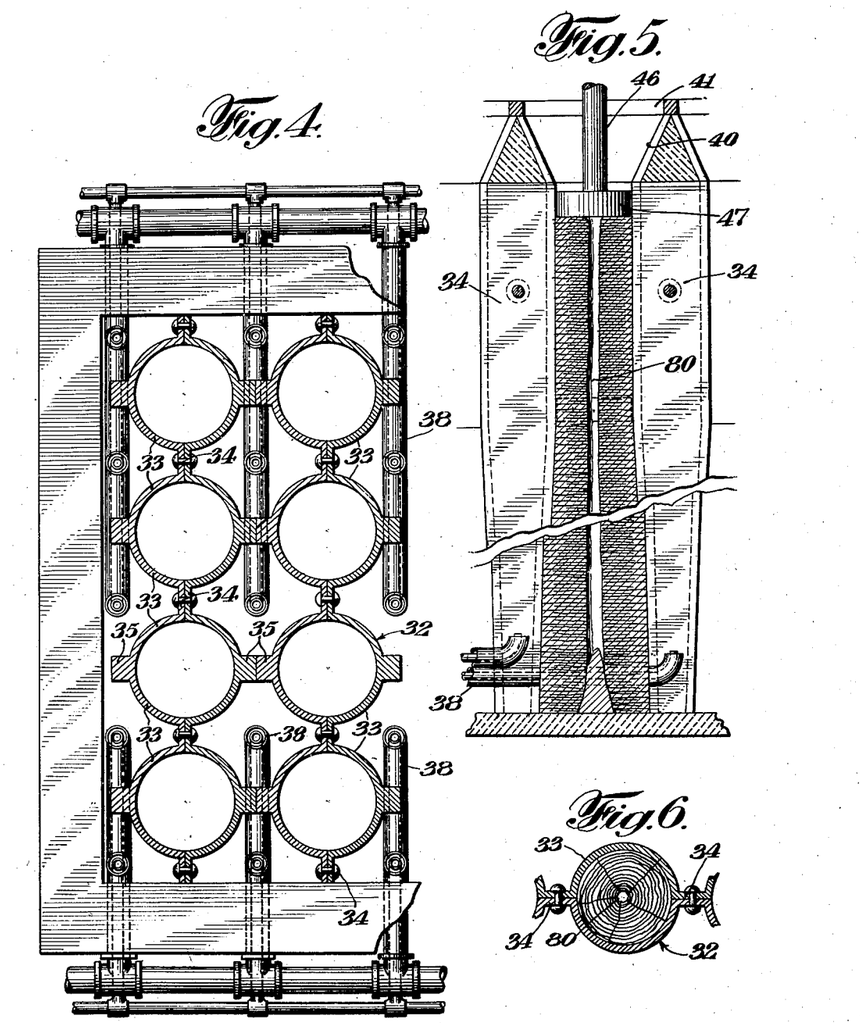
Fig. 4 is an enlarged top sectional view of a portion of a battery of retort tubes with details of their novel construction shown in relation to the burners for supplying heat thereto.
Fig. 5 is a vertical section through one of the retort tubes showing the manner in which the coke structure is formed into lumps of the desired size by natural lines of cleavage and also showing the formation of a hollow core in the material for the conduct and escape of vapors from the mass.
Fig. 6 is a top sectional view of the coked mass within a retort tube showing the hollow core for escape of vapors and the natural lines of irregular radial breakage or cleavage of the mass into lumps suitable for domestic purposes.

Mounted on supports 30 is a casing 31 of refractory material within which are positioned a number of retort tubes forming a battery. As shown in the drawings, each tube 32 of the battery is so shaped as to have a portion of uniform diameter extending a slight distance from the top thereof, while the remainder tapers gradually outward to the bottom. For example, the portion of uniform diameter may be approximately 4" diameter while the tapered portion extends to a bottom diameter of 5". The tubes are preferably formed by casting a number of half sections integrally as shown in Fig. 4. Each section is then composed of a plurality of semi-cylindrical parts 33 joined by integral flanges 34 which may be riveted to similar flanges of another section. Extending from each portion 33 and at right angles to flanges 34 are ribs 35 extending from the bottom of the tubes along the tapered portion to the bottom of the cylindrical section. When assembled, the ribs 35 of one section contact with ribs of another section to form a continuous wall from near the top to the bottom between the banks of tubes thus constructed. It will be seen that the provision of the flanges 34 and the ribs 35 causes the formation of a vertical channel between the respective tubes, which channels may well serve as flues causing the uniform distribution of heat around the various tubes. The ribs 35 terminate at approximately the point of beginning of outward taper of the tubes, so that the products of combustion may be withdrawn through a single outlet 37 positioned in one of the walls 31 near the top thereof. A plurality of burners 38 are positioned in the bottom of the casing, one in each of the channels or flues formed by the flanges 34 and ribs 35. These burners may be supplied with gas and air mixture, each under separately controlled pressures to maintain a flame giving the desired temperatures approximately the full height of the retort tubes, or other suitable fuel, preferably by gas obtained as a result of the distillation process employed.

In order that the hot gases and products of combustion may not escape from the top of the retort casing, each section of tubing is so cast as to form a conical outflaring portion 40 which also permits preheated coal to be dumped into the respective tubes more readily. A plate 41 is fastened over the top of the retort casing and this plate is provided with openings corresponding to the top of the cones 40. The plate necessarily is welded or otherwise tightly secured to the tops of the cones to prevent the escape of gases and its bottom surface may be lined with refractory material.

Movable into position directly over the tops of the retort tubes and vertically thereaway from is a hood 45 preferably of sheet steel covered with some refractory material. This hood is composed of a top and two side walls. In conjunction with the end walls of the retort casing, which extend upwardly beyond the top of the retort tubes, the hood 45, in the position shown in Fig. 1 forms a chamber for the collection of the gases and vapors evolved from the treatment of material in the retort tubes. These gases and vapors pass from this chamber through openings 55 in the stationary end walls of the retort casing. Extending through the top of the hood 45 are a plurality of plunger rods 46 corresponding in number to the number of retort tubes forming the battery. The lower end of each plunger 46 is supplied with a piston 47 which is of such size and shape as to fit fairly closely within the cylindrical portion of each tube 32 of uniform diameter. The fit of the piston within the tube is such as to permit the escape of gases and evolved vapors therearound, at the same time preventing the escape or expansion of the coal while tending to swell in volume in a plastic condition. Stuffing boxes 48 are necessarily supplied in the top of the hood 45 to prevent the escape of any gases from the hood. The top of each plunger rod 46 is provided with an enlarged head 49 and a short distance below the top is a similar head 50. The portion of each plunger rod 46 between the respective enlargements 49 and 50 is movable through a cross-head 51 which may be raised or lowered through the agency of a pair of pistons 52 operating in cylinders 53 either through the agency of hydraulic pressure, air pressure or other suitable arrangements. The cross-head 51 may be secured to the respective pistons 52 in any desired manner such as by means of a beam 54 extending between the two pistons. The purpose of this hydraulic piston arrangement is to permit the entire hood 45 to be lifted at the proper time so that the preheating battery may be moved into place to be emptied into and fill the retort tubes.

Extending from the openings 55 (before mentioned) in the end walls of the retort casing are conduits leading to suitable collecting apparatus 56 which may serve as condensers or perform any other desired function.

The bottoms of the retort tubes 32 are closed by means of a swinging trap door 60 which fits tightly against the ends of the tubes to prevent the escape of gas therefrom. Packing 61 of any desired suitable character is utilized for preventing the escape of products of combustion from the retort downwardly. This trap door 60 is movable into the position shown in dotted lines in Figs. 1 and 2 to permit the dumping of the coked material from the retort tubes.

Extending below the retort proper is a collecting and cooling chamber 62 formed of side walls of sheet metal, parts of which are surrounded by a water jacket 63. This chamber is maintained in a closed position by means of door 64 movable to permit the coke cooled therein to be emptied into a suitable receptacle.

The hot gases resulting from combustion in the chambers or flues defined by the various retort tubes as before mentioned are withdrawn from the retort through opening 37 into a mixing chamber 65 into which air can be introduced through opening 66 to reduce the temperature and add to the volume of the gases. After the gases have been cooled to the proper temperature by the addition of air, they are led under a baffle 67 into an opening 68 directly below the battery of preheating tubes 23 when in the position shown in Fig. 1. These gases of reduced temperature serve to heat the tubes 23 an amount sufficient to drive off practically all of the moisture in the coal introduced into these tubes and bring it to a temperature below the point at which it becomes plastic. In order that the gases can be withdrawn from the preheating chamber readily, each tube 23 has a small portion 70 near the top thereof of reduced diameter to permit the escape of the gases out through an opening 71 in the wall of the preheating chamber. This opening 71 in the nature of a tube is of such shape and size as to fit telescopically within the flue 72.

The operation of the apparatus hereinbefore described is substantially as follows: A measured quantity of slack or waste coal, preferably low volatile content bituminous coal, is fed from a hopper (not shown) into the dumping car 18. This car is then rolled into position over the preheating tubes 23 which are in the relative position shown in Fig. 1. When properly placed above the preheating tubes, the drop doors 19 are swung downwardly, dumping the coal directly into the tubes. When all the coal has been dumped, the car is withdrawn and, due to the fact as before mentioned that each end of the car extends down almost into contact with the top plate 25, any excess coal is scraped therefrom. At the time the coal is dumped into the tubes, the slide plate 27 necessarily is in such position that the solid portions are in register with the openings at the bottom of these tubes to prevent escape of the coal. The coal is then heated for the desired length of time corresponding to the time required to carbonize the material in the retort tubes, driving off substantially all the moisture contents thereof and heating it to a temperature of about 350° F. After the coal has been preheated, it is emptied into the retort tubes. For this purpose, the pistons 52 are operated to raise the cross-head 51, which in turn raises the plungers 46. When the pistons 47 of these plungers engage the hood 45, this hood also is raised and the movement is continued an amount sufficient to lift the hood into the position shown in Fig. 2. As soon as the hood has been raised to this upper position, the battery of preheating tubes 23 is rolled over along the tracks 13 into position directly above the battery of retort tubes. When the tubes of the two respective batteries are properly aligned vertically, the plate 27 is moved horizontally to permit the openings therein to register with the ends of the preheating tubes. The preheated coal falls by gravity into the respective retort tubes, the flared portion 40 thereof serving to aid in trapping all of the material. As the preheated coal falls into the retort tubes it comes to rest therein in a fairly compact state. As soon as the preheater tubes are empty, the battery is rolled back into its former position and the hood 45 immediately lowered into position on top of the retort casing.

Figure 1:
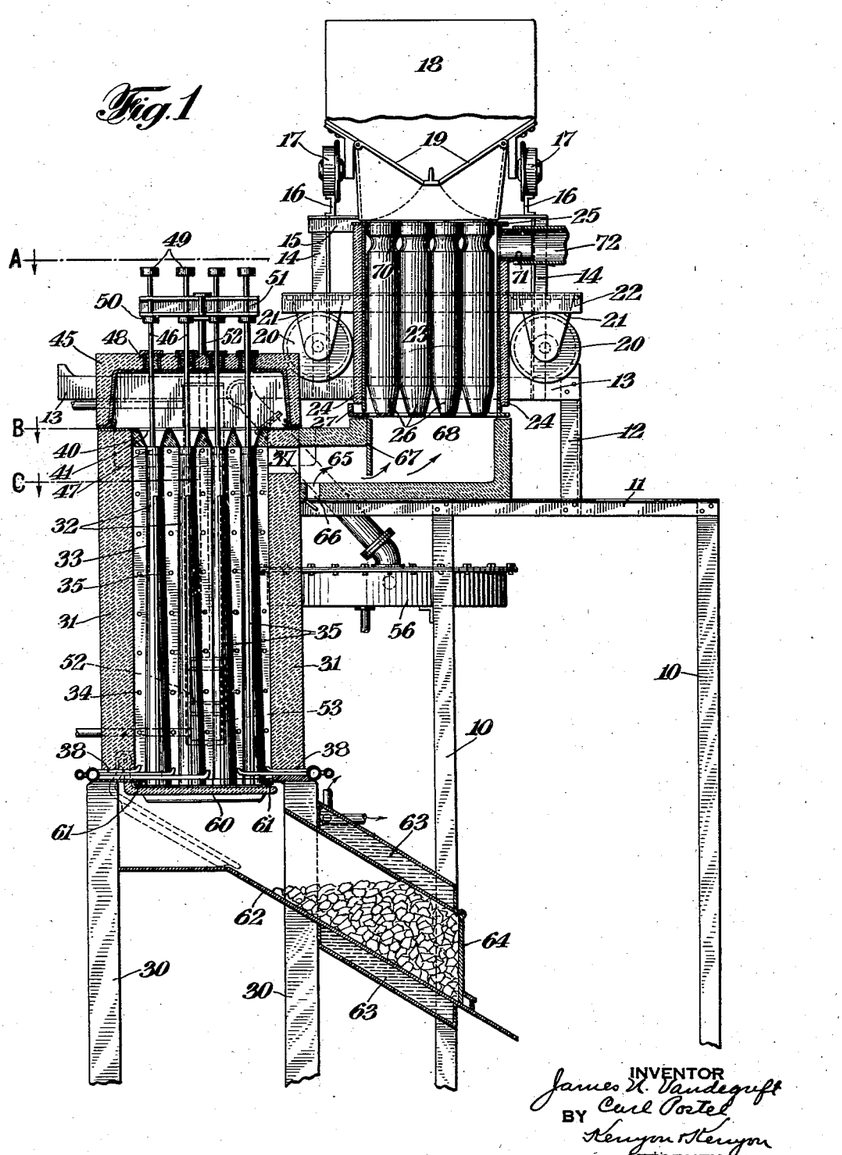
Figure 1 is a transverse section through an installation for accomplishing the desired results.

The pistons 52 are then moved to the position shown in Fig. 1, forcing the plungers 46 downwardly until pistons 47 rest on top of the preheated coal in the retort tubes. The temperature of the inner wall of the retort tubes at the time the preheated coal is dumped thereinto is approximately 1600° F. at the bottom and 1200° F. at the top or smaller section, so that within the few seconds time required for the withdrawal of the preheating tubes 23 and lowering of hood 45 the evolution of gas and volatiles commences. In order to preheat the tubes and maintain them during the coking operations at the temperatures mentioned, the furnace temperatures at the bottom and top of the retort tubes should preferably be maintained about 100° F. to 150° F. higher than the temperatures above given. This treatment of the coal is continued for the desired length of time, that is, until the volatile content of the coke has been reduced to about an average of about 4% to about 10%. During the carbonization the coal remains quiescent and free from agitation which would tend to prevent the coal from setting to a dense hard product. This necessarily means that the coke near the center of the tube has a higher volatile content than that near the wall of the retort. The radial sector lumps at the surface may approximate high temperature coke and toward the center low temperature coke of the higher volatile content to readily ignite the lump.

Due to the instantaneous application of heat within the retort tubes, the effect is to produce a core 80 within the mass almost instantaneously, which core is caused by the release and pressure of gases and vapors which must find an outlet. The core thus formed acts as an outlet for these gases which pass around the edges of the various pistons 47. As the annular clearance between the edges of pistons 47 and the side walls of the retort tubes is not great, the escape of the gases and vapors is substantially restricted. The escaping gases are collected in the chamber partially formed by hood 45, and are withdrawn therefrom through outlet pipes into the various receivers 56. During the continued heat treatment within the retorts, the mass of coal naturally becomes somewhat plastic, but the continued treatment causes a natural cleavage of the coal along almost uniformly spaced horizontal lines as shown clearly in Fig. 5. Likewise, there results irregular radial cleavages as shown in Fig. 6. With retort tubes of about five or six inches as their greatest dimension the lumps of coke formed by these various lines of cleavage are of a size admirably suited for domestic fuel purposes.

Figure 2:
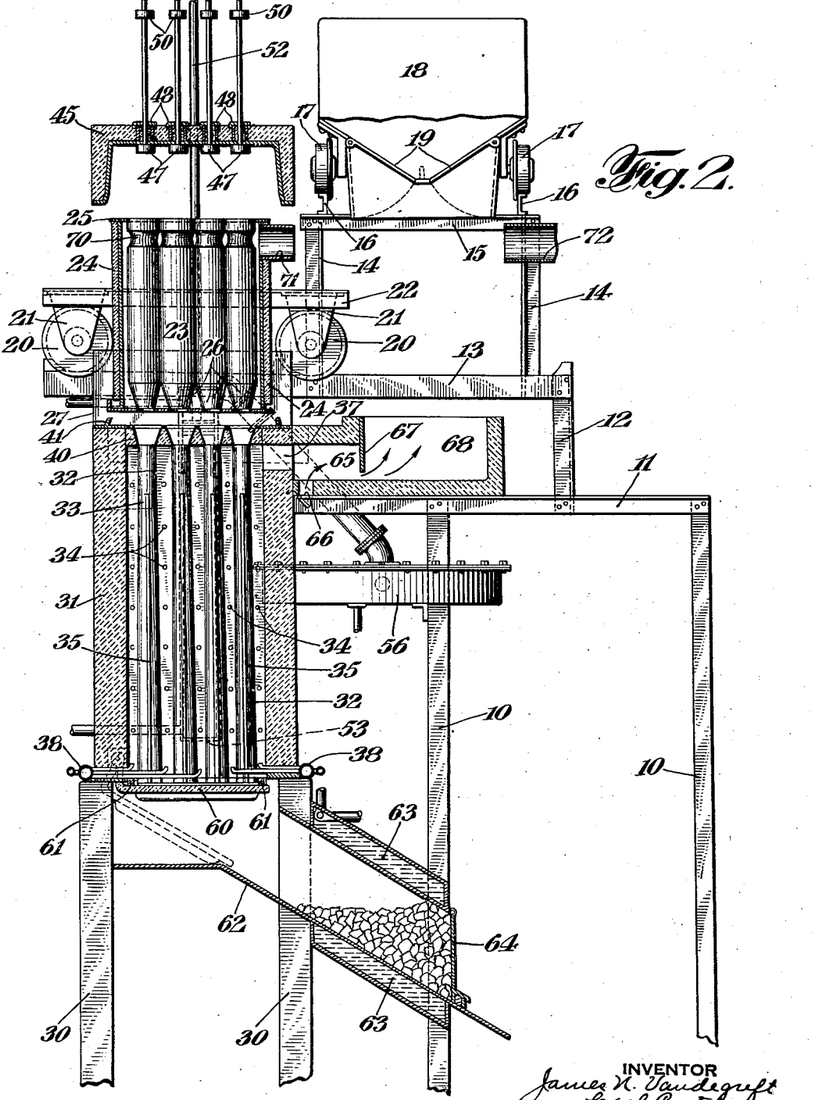
Fig. 2 is a similar section of the same apparatus in a different phase of the operation thereof.
Figure 3:
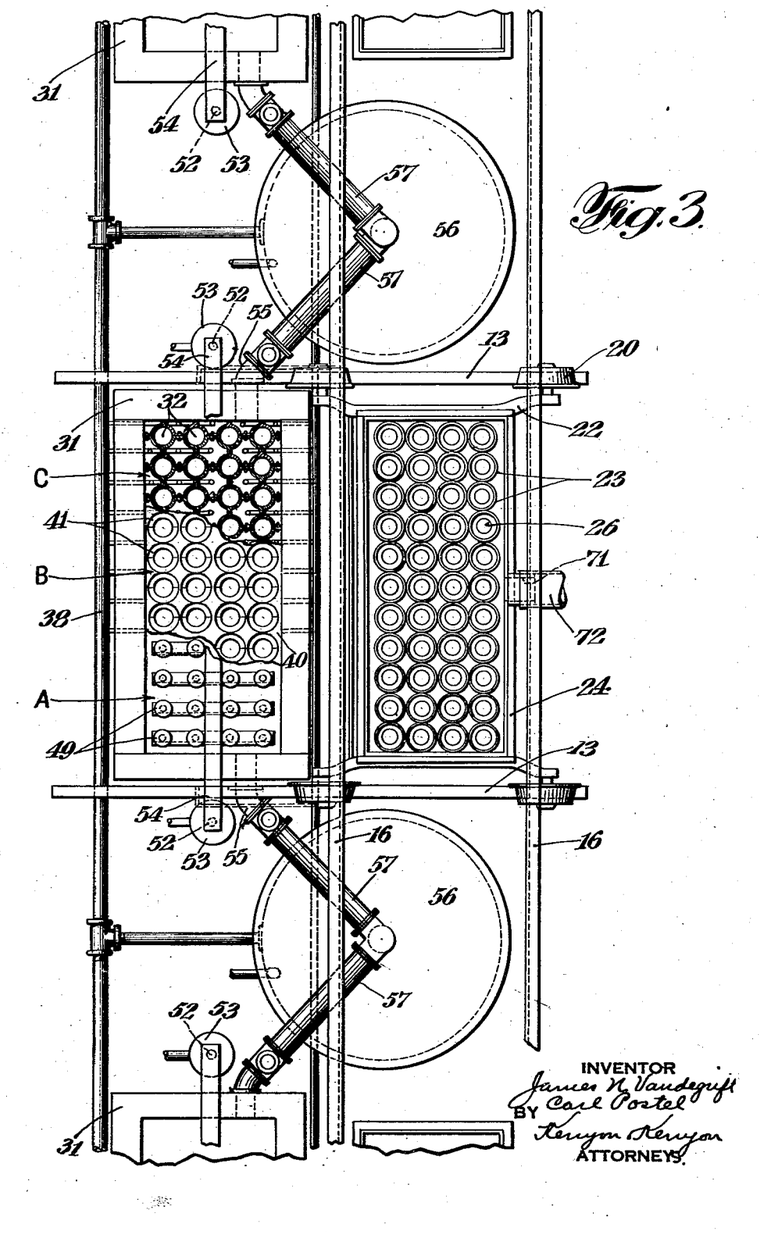
Fig. 3 is a top view of a battery of retort tubes, preheating tubes and condenser apparatus used in connection with the invention.

When the heat treatment has continued for the proper interval of time, the door 64 opens and drops the cooled coke from a previous charge, the door 64 is closed and the drop door 60 is moved into the position shown in dotted lines in Figs. 1 and 2 and pressure applied to force the plungers 46 downwardly. This downward forcing of the plungers serves to dislodge any fuel sticking to the retort tubes, and once it has been dislodged it falls from the tube by gravity. It is to be understood, however, that these plungers and their associated pistons have other functions than that of merely dislodging the finished fuel. During the treatment, the plungers prevent expansion of the material out of the top of the retort tubes since the plungers and pistons 47 cannot be moved upwardly due to the abutment of enlargements 50 upon the lower surface of cross-head 51. Furthermore, should there be any shrinkage of the material during the heat treatment, the weight of the pistons and their plungers is sufficient to compress the material into a compact mass and aid in forming a dense structure in the fuel.

After the material in its new form is dumped from the retort tubes, it falls naturally into the cooling chamber where it is allowed to remain until the next batch of material is ready to be dumped. Inasmuch as it has been found in practice that about one to one and one-half hours of treatment is substantially sufficient to produce the desired results, it will readily be seen that the same length of cooling will lower the temperature of the fuel to a temperature preventing combustion when discharged.

From the foregoing, it will be seen that by the practice of the present invention a new type of fuel especially adapted for domestic purposes is produced. The invention makes possible the utilization of bituminous slack or screenings heretofore marketable at a very low price. It will also be seen that the apparatus illustrated and described is by no means the only apparatus with which the process can be practiced, and that therefore the invention is to be limited only by the scope of the claims. Moreover, while specific temperatures, periods of treatment, dimensions of retort tubes and the like have been mentioned, it is to be understood that this has been done for purposes of illustration merely and that the specific figures above mentioned can be varied without departing from the scope of this invention. In this connection, for example, while specific mention has been made of retort tubes which have an internal diameter of 4 inches at the top and 5 inches at the bottom, it is apparent that these figures can be varied somewhat without departing from the scope of this invention. Thus, tubes and the elongated bodies or columns of material therein may be of slightly greater or lesser diameter, though it is preferable to employ tapered retort tubes which average less than 6 inches in internal diameter. Moreover, while vertical tapering circular retort tubes have been illustrated, it is apparent that the tubes do not have to be exactly as described, but that tubes having other curved or angular shapes of a general tubular nature have approximately similar radii in any one plane or having other positions may be employed. If a tube of slightly larger diameter is used the time taken to coke the material to proper degree may be somewhat greater than one hour or an hour and a half and may be as long as two hours. Moreover, the period of treatment and temperatures employed may be varied somewhat depending upon the nature of the coking coals or mixtures of coking and non-coking coals which are processed and depending upon the volatile content and other properties which it is desired to obtain in the finished product. In this connection, higher temperatures tend to produce more rapid evolution of volatile matter from the coking mass and longer periods of treatment tend to result in more complete distillation of volatile matter. This invention includes a process wherein the non-volatilized constituents of a coking mass are compacted against substantial expansion by permitting the non-volatilized constituents to expand slightly before being confined within a limited volume which thereafter restricts further expansion and compacts the mass to form a hard dense coke. In fact such slight preliminary expansion may be desirable in preventing rupture of the apparatus when coking a cokable material which tends to increase very greatly in size and with very great force. Preferably, however, a body of cokable material is confined so that the non-volatilized constituents do not expand during coking beyond the volume of the body prior to the coking step. Moreover, other confining means than the pistons shown by way of illustration may be used to compact the non-volatilized constituents of coking cokable materials in the practice of this invention. The temperatures, periods of treatment, etc., above illustrated, are, however, preferable according to this invention and produce from very cheap materials, in a simple way, a new fuel having remarkable properties as a domestic fuel, as a metallurgical coke and for other purposes.

We claim:

1. A batch process of making coke which comprises carbonizing a body of solid dehydrated cokable material containing coking coal which tends to expand upon coking by suddenly subjecting a compact body of the material peripherally inwardly to carbonization temperatures of about 1200° F. to 1600° F. thereby rapidly heating the body of material to a plastic condition and continuing to intensively heat the body of material peripherally inwardly by maintaining the peripheral temperature at about 1200° F. to about 1600° F. during the plastic stage of the carbonization, the non-volatilized constituents of the material being quiescent and confined against substantial expansion substantially throughout the plastic stage of the carbonization to a volume greater than that of said body prior to the carbonization step.

2. A batch process of manufacturing coke which comprises carbonizing solid cokable material containing coking coal by rapidly heating a column of said material peripherally inwardly and forcibly distilling off gases and vapors while confining the non-volatilized constituents of the material against substantial expansion and taking off the forcibly evolved gases and vapors substantially entirely at an end of the column, thereby forming a substantially hollow core through the column of material and compacting the non-volatilized constituents radially toward the periphery of the column.

3. A batch process of making coke which comprises carbonizing previously dehydrated coking coal containing about 14% to about 25% of volatile matter exclusive of moisture in a compact body by heating the same peripherally inwardly in a quiescent condition at a temperature of about 1200° F. to about 1600° F. while confining the non-volatilized constituents of the coking coal during the plastic stage of carbonization against expanding substantially beyond the bulk of the body of coal prior to the carbonization step.

4. A batch process of making coke from solid cokable material containing bituminous coking coal, said material containing about 14% to 25% of volatile matter exclusive of moisture, which comprises introducing a mass of the previously dehydrated material into a preheated vertical retort tube about 5 to 6 inches in internal diameter, said retort tube being preheated to a temperature of between about 1200° F. and about 1600° F., carbonizing said material in said retort tube while maintaining the temperature of said retort tube between about 1200° F. and about 1600° F. substantially throughout the plastic stage of carbonization of said material in said retort tube, confining substantially throughout the plastic stage of carbonization the non-volatilized constituents of the mass of material in said retort tube so as to prevent any substantial expansion thereof, maintaining the material quiescent substantially throughout the plastic stage of carbonization, withdrawing the evolved gases and vapors from an end of said retort tube substantially throughout the plastic stage of carbonization, continuing the carbonization of the material in said retort tube until the volatile content thereof exclusive of moisture is reduced to about 4% to about 10%, and discharging the carbonized material from said retort tube.

5. As a product, lump coke, the individual lumps of which are characterized by being substantially throughout sufficiently hard to withstand pressures of 400 pounds per square inch, by having a minor proportion of pores greater than .04 inch in diameter, by having a volatile content exclusive of moisture of about four per cent. to about ten per cent., and by having an external portion which is quicker igniting and contains a substantially greater amount of volatile matter exclusive of moisture than the remainder of the lumps.

6. As a product, lump coke, the individual lumps of which are characterized by having substantially throughout only a minor proportion of pores greater than .01 inch in diameter, by having substantially throughout a resistance to crushing greater than about 400 pounds per square inch and by having a volatile content exclusive of moisture of about four per cent. to about ten per cent., the volatile content exclusive of moisture of a minor portion of the individual lumps being substantially higher than the volatile content exclusive of moisture of the remainder of the lumps.

7. As a product, lump coke, the individual lumps of which are characterized by being about one to four inches in diameter, by having substantially throughout a major proportion of pores less than .01 inch in diameter, by being resistant to crushing strains in the neighborhood of 900 pounds per square inch on the average, by having less than about thirty per cent. variation in hardness substantially throughout, by having an average volatile content exclusive of moisture of about four per cent. to about ten per cent., by having an external minor portion having about six per cent. to about ten per cent. volatile matter exclusive of moisture and by having a portion having about two to five per cent. volatile matter exclusive of moisture, the volatile matter exclusive of moisture being graduated in the lump between said two portions and there being a difference in amount of volatile matter exclusive of moisture in said respective portions which is greater than about three per cent.

8. As a product, lump coke, the individual lumps of which are characterized by being in the form of sector-shaped lumps about one to four inches in thickness, by having substantially uniformly throughout a major proportion of pores less than .01 inch in diameter, by being able to withstand crushing strains of 400 pounds per square inch, by containing about four per cent. to about ten per cent. of volatile matter exclusive of moisture, and by comprising an external portion and a body portion, which body portion is slower burning than said external portion, the volatile content exclusive of moisture being about two per cent. to about five per cent. in the body portion and by being about six per cent. to about ten per cent. in the external portion, the amount of volatile matter exclusive of moisture in the external portion being more than about three per cent. greater than that in the body portion, the volatile content in the lumps being graduated between said portions.

JAMES N. VANDEGRIFT.
CARL POSTEL.